Patented Apr. 18, 1939

2,154,700

UNITED STATES PATENT OFFICE 2,154,700

ELECTRICAL CONTACTING ELEMENT

Samuel Ruben, New Rochelle, N. Y.

No Drawing. Application August 31, 1936,
Serial No. 98,790

2 Claims. (Cl. 200—166)

This invention relates to an electrical contacting element.

An object of the invention is the provision of a chromium-base contacting element which may be readily and economically produced.

Other objects will be apparent from the disclosure.

While chromium possesses an unusually high hardness and is a good electrical conductor, it has not heretofore been generally used as an electrical contacting material. The difficulty seems to have been associated with the extreme hardness of the material which makes it very difficult to work.

I have found that if chromium and tin be mixed and pressed together, and heated to a temperature in excess of the melting point of tin, that an electrical contacting element of exceptional merit is obtained. The heating should take place in vacuum.

In the preparation of the material, I use finely-divided chromium and tin which are ball milled together to provide a complete and uniform mixture, the per cent of tin present varying between a useful or appreciable amount, such as, about 1% and up to approximately 10%, depending upon the properties desired in the finished product. After the chromium and tin have been ball milled a sufficient length of time to obtain uniform mixing, they are hot pressed into ingot form at a temperature somewhat above the melting point of tin, for instance, 250° C. This allows sufficient bonding for handling but leaves the material in a comparatively soft condition.

The next step and an important one is to heat the pressed and bonded material in vacuum at a temperature several times above the melting point of tin, for instance, at a temperature of about 800° C. As distinguished from heat treating in a reducing atmosphere such as hydrogen, the vacuum heat treating is preferable, inasmuch as undesirable absorption of the hydrogen gas is avoided. The heat treating brings about a further and complete bonding and results in the production of a material of very high hardness, remarkable toughness and low electrical resistance. The dual qualities of high hardness and low electrical resistance are of real importance in electrical contacting elements. The hard smooth surface of the material may be highly polished.

Because of its resistance to oxidation and its property of forming a tenacious combination with the chromium, tin appears to be the ideal material for use with the chromium. Apparently it is held in by absorption by the chromium crystals or is alloyed in part, as electrical contacting members made from the chromium-tin composition may be operated far above the melting point of tin without loss of the tin.

I claim:

1. An electrical contacting element composed substantially of chromium and containing from an appreciable amount to 10% tin.

2. An electrical contacting element containing tin in the order of 1 to 10% and the balance substantially all chromium.

SAMUEL RUBEN.